Patented Oct. 27, 1936

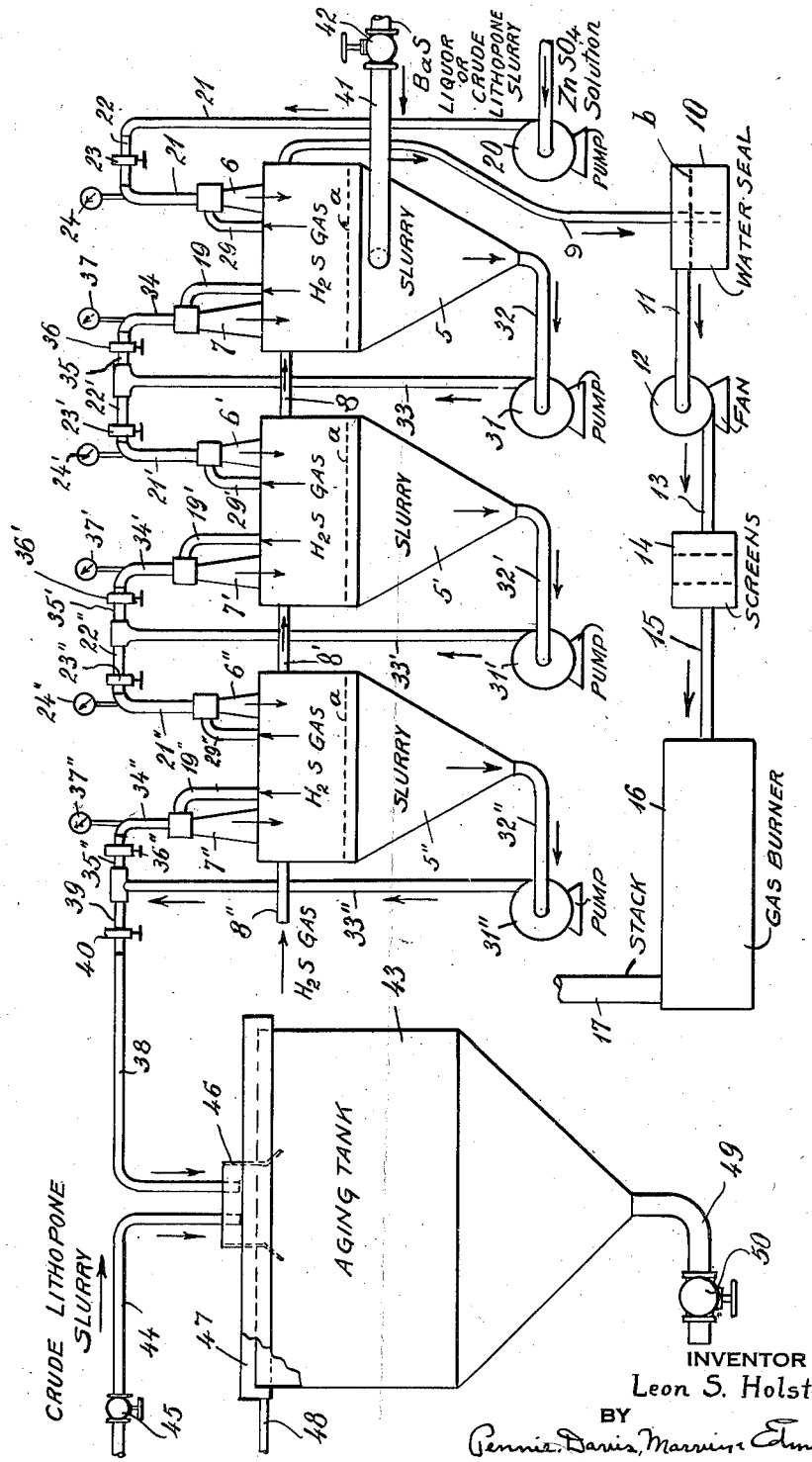

2,058,879

UNITED STATES PATENT OFFICE 2,058,879

HIGH STRENGTH LITHOPONE

Leon S. Holstein, Great Neck, N. Y., assignor to The New Jersey Zinc Company, New York, N. Y., a corporation of New Jersey Application June 22, 1934, Serial No. 731,821

12 Claims. (Cl. 134—78)

This invention relates to high strength lithopone, and has for its object an improved method of making such lithopone. High strength lithopone contains more than 30% zinc sulphide, which is the approximate percentage of zinc sulphide in normal lithopone produced by the usual reaction of barium sulphide liquor with zinc sulphate solution as represented by the following equation:

$$BaS + ZnSO_4 = ZnS + BaSO_4$$

One of the heretofore customary methods of producing high strength lithopone involves mixing, in predetermined proportions, crude normal lithopone (coprecipitated zinc sulphide and barium sulphate) and separately prepared zinc sulphide, and subjecting the resulting mixture to the customary subsequent operations of lithopone manufacture. In using crude washed zinc sulphide precipitated from a zinc sulphate solution by hydrogen sulphide for producing high strength lithopone by that method, it has been found that the finished product is deficient in pigmentary properties in proportion to its zinc sulphide content. I have discovered that this deficiency is due, in part at least, to the fact that the two different types of zinc sulphide (namely, that in lithopone precipitated by barium sulphide and that precipitated by hydrogen sulphide) require different muffling or calcining treatments in order to bring out the most effective pigmentary properties. I have further discovered that the two different types of zinc sulphide may for all practical purposes be made equally amenable to the same calcining treatment by subjecting the zinc sulphide in lithopone to conditions of preparation similar to the conditions of preparation of the zinc sulphide precipitated by hydrogen sulphide.

Based on these discoveries, my invention contemplates the production of high strength lithopone (containing over 30% zinc sulphide) by including crude coprecipitated zinc sulphide and barium sulphate (crude normal lithopone) in an aqueous slurry in which precipitation of zinc sulphide by the action between hydrogen sulphide and zinc sulphate is proceeding, and thereby subjecting the zinc sulphide in the coprecipitate to the same conditioning environment as the zinc sulphide precipitated by hydrogen sulphide. The crude coprecipitated zinc sulphide and barium sulphate may be introduced into the slurry during any stage in the precipitation of the zinc sulphide by hydrogen sulphide, or may be precipitated in situ simultaneously with the zinc sulphide by the joint action of hydrogen sulphide and barium sulphide upon an aqueous solution of zinc sulphate. The resulting precipitate mixture (i. e. coprecipitated zinc sulphide and barium sulphate and zinc sulphide precipitated by hydrogen sulphide) is washed to remove acids and then subjected to the customary subsequent operations of lithopone manufacture.

A characteristic feature of the invention is the exposure of crude coprecipitated zinc sulphide and barium sulphate to the action of a slurry of crude zinc sulphide in which the precipitation of zinc sulphide by reaction with hydrogen sulphide gas is proceeding. The resulting precipitate mixture, after washing to remove acid and subjection to the usual subsequent operations of lithopone manufacture, becomes a high strength lithopone having pigmentary properties superior to those of the pigment produced by mixing crude lithopone with separately prepared and washed crude zinc sulphide precipitated by the hydrogen sulphide process. It is my present belief that by the method of the invention the zinc sulphide in the crude coprecipitate is subjected to a conditioning treatment similar to that given the zinc sulphide precipitated by hydrogen sulphide and in consequence thereof the zinc sulphide in the coprecipitate has substantially the same properties as the zinc sulphide precipitated by hydrogen sulphide. Thus, the resulting slurry of crude coprecipitate and crude zinc sulphide is homogeneous with respect to the entire zinc sulphide content thereof so that the calcining, quenching and finishing operations bring out the optimum tinting strength of both types of zinc sulphide.

In practicing the invention, it is not necessary that all of the crude normal lithopone be exposed to the slurry in which the precipitation of zinc sulphide by the action of hydrogen sulphide is proceeding. Thus, a crude high strength lithopone slurry containing 75% zinc sulphide may be produced in accordance with the invention, and this crude slurry may then be mixed in any appropriate manner with sufficient crude normal lithopone to bring the zinc sulphide content down to between 50 and 60%. The resulting precipitate mixture, when calcined, quenched and finished in the customary manner of lithopone manufacture, produces a high strength lithopone of satisfactory pigmentary properties.

The precipitation of the zinc sulphide by hydrogen sulphide is preferably carried out in the manner disclosed in the copending application for Letters Patent of the United States of Arne J. Myhren and Byron Marquis, Serial No. 702,578, filed December 15, 1933, now Patent No. 2,020,325. In that method the slurry, resulting from the partial interaction of hydrogen sulphide and zinc sulphate, is repeatedly mixed with hydrogen sulphide gas in a series of eductors through which the gas is entrained by the slurry. In accordance with my present invention, coprecipitated zinc sulphide and barium sulphate is included in this slurry at some appropriate stage during the precipitation of zinc sulphide by hydrogen sulphide. Thus, for example, the coprecipitate may be formed in situ in the slurry by introducing barium sulphide liquor, or a crude slurry of normal lithophone may be introduced into the slurry of zinc sulphide being precipitated by hydrogen sulphide. Again, crude normal lithopone may be added to the zinc sulphide slurry during an aging treatment of several hours' duration in the course of which substantial completion of the reaction between hydrogen sulphide and zinc sulphate takes place.

The invention will be more readily understood from the following description taken in conjunction with the accompanying drawing, in which the single figure is a diagrammatic elevation of a suitable apparatus for practicing the invention.

The apparatus illustrated in the drawing comprises three tanks 5, 5', 5'' (arranged in series), of circular cross-section and with conical bottoms, each tank being provided with two Venturi tube eductors 6 and 7, 6' and 7' and 6'' and 7'', respectively. The series of tanks is provided with a gas inlet pipe 8'' (entering the top portion of tank 5'') and a gas outlet pipe 9 (discharging from tank 5). Gas pipes 8' and 8 connect the top portions of tank 5'' and 5' and the top portions of tanks 5' and 5, respectively. The system of pipes 8'', 8', 8 and 9 connects the tanks in series at points above the normal level (a) of liquid or slurry therein in such fashion that gas can flow freely through the series of tanks.

The gas outlet pipe 9 dips below the liquid-level (b) in a water seal 10. The gas space above the liquid-level (b) in the water seal 10 is connected by a pipe 11 with the suction side of a fan 12. The pressure side of the fan 12 is connected by a pipe 13 with a screen-box 14, which contains metal screens set across the path of the gases therethrough. The screen box 14 is connected by a pipe 15 to a gas burner 16, provided with a stack 17.

The tanks 5, 5' and 5'' are provided with pumps for liquid and/or slurry transport, and pipe lines for liquid or slurry are appropriately connected with the pumps, tanks and Venturi tube eductors in such fashion that liquid and/or slurry can be transported through the series of tanks and likewise partly recirculated in the individual tanks, while being brought into intimate contact with gas traversing the series of tanks in general counter-current with the liquid and/or slurry. Each of the six Venturi tube eductors (6, 7, 6', 7', 6'' and 7'') is arranged to recirculate gas through the tank with which it is operatively associated, withdrawing gas through pipes 29, 19, 29', 19', 29'', 19'', respectively, while intimately mixing the gas with the liquid and/or slurry. The Venturi tube eductor 6 introduces the liquid into the system by discharging it into tank 5. The Venturi tube eductors 7, 7' and 7'' serve to recirculate liquid or slurry through the tanks with which they are connected (through tanks 5, 5' and 5'', respectively). The Venturi tube eductors 6' and 6'' serve to convey liquid or slurry from one tank into the next tank in the series. Thus, Venturi tube eductor 6' serves to convey liquid or slurry (withdrawn from tank 5) into tank 5'; and Venturi tube eductor 6'' serves to convey liquid or slurry (withdrawn from tank 5') into tank 5''.

The apparatus shown in the drawing is similar to that shown and described in U. S. Appl. Ser. No. 702,578 and is operated as follows for producing a slurry of high strength lithopone in accordance with the present invention:

Hydrogen sulphide is introduced into the series of tanks through the inlet 8'', and is drawn through tank 5'', pipe 8', tank 5', pipe 8, tank 5, outlet pipe 9 and water seal 10 by the suction produced by the fan 12. The effective suction of the fan 12 is adjusted and regulated by suitable adjustment of the water-level (b) in the water-seal 10; lowering of the water level b increasing the effective suction of the fan and raising of the water level decreasing the effective suction. It will be understood that the absorption of hydrogen sulphide by solution in, and reaction with, the zinc sulphate solution likewise tends to draw gas into the system through the pipe 8'' by suction. The water-seal prevents air from entering the system when the fan 12 is shut down for any reason, as for example for the purpose of attaching a spare fan to the gas outlet line 9.

The fan 12 forces the gas through the line 13, the screen box 14 and the line 15 to the gas burner 16. The products of combustion (e. g. sulphur dioxide) are removed from the burner 16 by the stack 17. Back-firing of flame from the burner 16 into the system is guarded against by metal screens (preferably made of a metal of high heat conductivity, e. g. copper) placed in the path of the gases in screen-box 14. The water-seal 10 is a further safe guard against back-firing.

Purified zinc sulphate solution is introduced (preferably continuously) into the system by pump 20, which delivers the solution to the Venturi tube eductor 6 through a pipe 21. The amount of solution transported by the pump 20 through the pipe 21 is regulated by adjustment of a pinch valve 23 on a hose segment 22. The rate of flow of solution into the Venturi tube eductor 6 is indicated by a pressure gauge 24, connected in the pipe line 21 at a point between the Venturi tube eductor 6 and the pinch valve 23.

In passing through the Venturi tube eductor 6, the solution draws hydrogen sulphide gas from the tank 5 through the pipe 29 and the solution and entrained gas are discharged into the tank 5. The gas is brought into intimate contact with the solution in the form of thin films and small droplets in the eductor so that the reaction between hydrogen sulphide and zinc sulphate is initiated, with the formation of a slurry of zinc sulphide, zinc sulphate and sulphuric acid. The Venturi tube eductor is preferably so operated as to entrain with the solution a volume of gas greatly in excess of the volume of solution; for example, the volume of hydrogen sulphide gas carried through the eductor by the solution may be from 25 to 50 times the volume of the solution, or even more.

The slurry charged into the tank 5 through the eductor 6 is withdrawn from the orifice in the conical bottom of the tank through the pipe 32 by the pump 31, which forces the slurry through the pipe 33, into the branch pipes 34 and 21'. The relative amounts of slurry flowing into these branch pipes are regulated by appropriate adjustments of pinch valves 36 and 23' on hose segments 35 and 22', respectively. Pressure gauges 37 and 24', respectively, indicate the prevailing pressures and thus the rates of flow in these two branch pipes. The slurry entering the Venturi tube eductor 7 is mixed therein with hydrogen sulphide gas taken from the tank 5 through the pipe 19, and then returned to tank 5. The eductor 7 functions with respect to mixing the gas (taken from the tank 5 through the pipe 29) and slurry in the same manner as the eductor 6. The slurry entering the branch pipe 21' passes into the eductor 6', which functions in the same manner as eductor 6, with respect to mixing the slurry with gas (except, of course, that the eductor 6' draws gas through its gas-pipe 29' from the tank 5'). The eductor 6' discharges slurry into tank 5' and thus transports slurry from tank 5 to tank 5'; while the eductor 7 returns slurry to tank 5.

In accordance with one embodiment of the present invention, a stream of barium sulphide liquor is introduced by an inlet pipe 41 into the tank 5. The barium sulphide liquor may, if desired, be introduced into either of the other tanks 5' and 5'' or into any two or all of the tanks. The barium sulphide liquor on coming into contact with the zinc sulphate solution reacts therewith to form a precipitate of crude normal lithopone, which then circulates through the system of tanks together with the slurry of crude zinc sulphide. Any reaction that may occur between the barium sulphide solution and the sulphuric acid liberated by the reaction

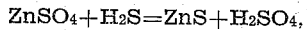
$$ZnSO_4 + H_2S = ZnS + H_2SO_4,$$

which is simultaneously proceeding, does not affect the final result, since the reaction

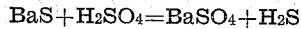
$$BaS + H_2SO_4 = BaSO_4 + H_2S$$

regenerates hydrogen sulphide gas which then reacts with the zinc sulphate solution to form zinc sulphide equivalent to the barium sulphate formed by the reaction between the barium sulphide and sulphuric acid. The amount of barium sulphide introduced into the tank 5 is adjusted (by valve 42) with respect to the amount of zinc sulphate solution introduced so as to produce a high strength lithopone of the desired zinc sulphide content.

In the production of zinc sulphide by the method of U. S. Patent No. 2,020,325 a preferred concentration of zinc sulphate solution is a $ZnSO_4$ content equivalent to 30 grams Zn per liter. In the practice of the present invention, this concentration of the zinc sulphate solution may be increased to compensate for the zinc sulphate consumed by reaction with the barium sulphide solution introduced.

In another embodiment of the invention, a slurry of crude lithopone in suspension in water is introduced into the system of tanks 5, 5' and 5'' through the inlet pipe 41, and is permitted to circulate through the system together with the slurry of crude zinc sulphide being produced therein by the reaction of hydrogen sulphide gas with zinc sulphate solution. The crude lithopone slurry may be introduced into any one or more of the tanks 5, 5' and 5''. The concentration of the zinc sulphate solution introduced into the system through the pipe 21 may be increased to compensate for the dilution effected by the water in the slurry of crude lithopone; or, the slurry of crude lithopone may be in suspension in an aqueous solution of zinc sulphate of equal strength to that of the fresh zinc sulphate solution introduced into the system.

In another embodiment of the invention, crude lithopone in the form of slurry is added to an aging tank 43 through an inlet pipe 44 having a valve 45. The aging tank has a peripheral overflow launder 47 and associated liquor outlet pipe 48, and its conical bottom has an outlet 49 with control valve 50 for the discharge of the aged and thickened slurry. The crude slurry of lithopone thus introduced is aged with the crude zinc sulphide slurry discharged through the pipe 38 from the last mixing tank 5''. The two pipes 43 and 38 may advantageously discharge into a distributing hood 46 at the top of the aging tank. The relative amounts of the zinc sulphide slurry discharged through the pipe 38 and returned to the tank 5'' are controlled by appropriate adjustment of the pinch valves 36'' and 40 on the hose connections 35'' and 39, respectively. This aging operation may for example be continued for from four to twelve hours when the crude zinc sulphide slurry is produced from zinc sulphate solution containing about 30 grams Zn per liter so that the crude slurry after discharge from the tank 5'' into the aging tank 43 has a sulphuric acid content of about 4.5%.

During the aging of a crude zinc sulphide slurry produced by the interaction of hydrogen sulphide gas and zinc sulphate solution, the reaction between hydrogen sulphide and zinc sulphate continues with further elimination of zinc sulphate from the solution and production of zinc sulphide. This reaction appears to be due to the desorption of adsorbed hydrogen sulphide from the zinc sulphide particles and its reaction with the residual zinc sulphate in solution. In consequence of this aging reaction, the crude slurry of lithopone present during the aging is exposed to the action of a slurry, in which precipitation of zinc sulphide by hydrogen sulphide gas is proceeding.

The crude pulp of high strength lithopone obtained in practicing the invention as hereinbefore described is washed to remove acid. This washing treatment is important since the precipitation of zinc sulphide by hydrogen sulphide gas results in the formation of sulphuric acid which must be removed from the crude precipitate prior to imparting thereto the usual slight degree of alkalinity. Thus, for example, the thickened slurry or pulp from the aging tank 43 is washed on a filter, the washed filter cake is repulped and then end-pointed. The crude high strength lithopone pulp is then subjected to the customary subsequent operations of filtering, drying, calcining, quenching, wet disintegration, drying and dry-grinding.

The finished high strength lithopone made in accordance with the invention possesses entirely satisfactory pigmentary properties. Its tinting strength is substantially superior to that of a high strength lithopone of the same zinc sulphide content produced by mixing crude normal lithopone with crude washed zinc sulphide prepared by the hydrogen sulphide process. Thus, for example, where crude lithopone is precipitated in situ in the mixing system as hereinbefore described, a product containing 42.7% total zinc calculated as zinc sulphide has a tinting strength equal to a high strength lithopone containing about 55% zinc sulphide produced by mixing crude lithopone with crude and washed zinc sulphide prepared by the hydrogen sulphide process.

I claim:

1. The method of producing high strength lithopone which comprises including coprecipated zinc sulphide and barium sulphate in a slurry in which precipitation of zinc sulphide by the reaction between hydrogen sulphide and zinc sulphate is proceeding and thereby subjecting the zinc sulphide in the coprecipitate to the same conditioning environment as the zinc sulphide precipitated by hydrogen sulphide, and washing the resulting precipitate mixture to remove acid preparatory to the customary subsequent operations of lithopone manufacture.

2. The method of producing high strength lithopone which comprises precipitating zinc sulphide by the reaction between hydrogen sulphide and zinc sulphate in a slurry containing coprecipitated zinc sulphide and barium sulphate, washing the resulting precipitate mixture to remove acid, and subjecting the washed precipitate mixture to the customary subsequent operations of lithopone manufacture.

3. The method of producing high strength lithopone which comprises completing with a detention period of several hours the precipitation of zinc sulphide by the reaction between hydrogen sulphide and zinc sulphate in a slurry containing coprecipitated zinc sulphide and barium sulphate, and washing the resulting precipitate mixture to remove acid preparatory to the customary subsequent operations of lithopone manufacture.

4. The method of producing high strength lithopone which comprises precipitating zinc sulphide by the reaction between hydrogen sulphide and zinc sulphate in a slurry containing coprecipitated zinc sulphide and barium sulphate, repeatedly mixing the slurry with hydrogen sulphide gas in a series of eductors through which the gas is entrained by the slurry, and washing the resulting precipitate mixture to remove acid preparatory to the customary subsequent operations of lithopone manufacture.

5. The method of producing high strength lithopone which comprises precipitating zinc sulphide by the reaction between hydrogen sulphide and zinc sulphate in a slurry containing coprecipitated zinc sulphide and barium sulphate, repeatedly mixing the slurry with a relatively much larger volume of hydrogen sulphide gas in an eductor discharging into an atmosphere of hydrogen sulphide gas in a closed tank partly filled with the slurry, and washing the resulting precipitate mixture to remove acid preparatory to the customary subsequent operations of lithopone manufacture.

6. The method of producing high strength lithopone which comprises precipitating zinc sulphide by the reaction between hydrogen sulphide and zinc sulphate in a slurry containing coprecipitated zinc sulphide and barium sulphate, repeatedly mixing the slurry with hydrogen sulphide gas in a series of eductors through which the gas is entrained by the slurry, subjecting the finally mixed slurry to an aging treatment of several hours duration to substantially complete the reaction between hydrogen sulphide and zinc sulphate, and washing the resulting precipitate mixture to remove acid preparatory to the customary subsequent operations of lithopone manufacture.

7. The method of producing high strength lithopone which comprises precipitating zinc sulphide by the reaction between hydrogen sulphide and zinc sulphate in a slurry containing coprecipitated zinc sulphide and barium sulphate, mixing the slurry with a relatively much larger volume of hydrogen sulphide gas in an eductor discharging into an atmosphere of hydrogen sulphide gas in a closed tank partly filled with the slurry, subjecting the finally mixed slurry to an aging treatment of several hours duration to substantially complete the reaction between hydrogen sulphide and zinc sulphate, and washing the resulting precipitate mixture to remove acid preparatory to the customary subsequent operations of lithopone manufacture.

8. The method of producing high strength lithopone which comprises precipitating zinc sulphide by the action of hydrogen sulphide upon an aqueous solution of zinc sulphate in the presence of a co-precipitate of barium sulphate and zinc sulphide formed in situ by introducing barium sulphide liquor, completing the precipitating reactions in an aging treatment of several hours duration, and washing the resulting precipitate to remove acid preparatory to the customary subsequent operations of lithopone manufacture.

9. The method of producing high strength lithopone which comprises precipitating zinc sulphide by the action of hydrogen sulphide upon an aqueous solution of zinc sulphate in the presence of a co-precipitate of barium sulphate and zinc sulphide formed in situ by introducing barium sulphide liquor, repeatedly mixing with hydrogen sulphide gas the slurry resulting from the partial interaction of said precipitants in a series of eductors through which the gas is entrained by the slurry, and washing the resulting precipitate to remove acid preparatory to the customary subsequent operations of lithopone manufacture.

10. The method of producing high strength lithopone which comprises precipitating zinc sulphide by the action of hydrogen sulphide upon an aqueous solution of zinc sulphate in the presence of a co-precipitate of barium sulphate and zinc sulphide formed in situ by introducing barium sulphide liquor, repeatedly mixing a slurry resulting from the partial interaction of said precipitants with a relatively much larger volume of hydrogen sulphide gas in an eductor discharging into an atmosphere of hydrogen sulphide gas in a closed tank partly filled with the slurry, and washing the resulting precipitate to remove acid preparatory to the customary subsequent operations of lithopone manufacture.

11. The method of producing high strength lithopone which comprises precipitating zinc sulphide by the reaction between hydrogen sulphide and zinc sulphate, repeatedly mixing the slurry resulting from the partial interaction of the hydrogen sulphide and zinc sulphate with hydrogen sulphide gas in a series of eductors through which the gas is entrained by the slurry, incorporating coprecipitated zinc sulphide and barium sulphate in the finally mixed slurry of zinc sulphide and subjecting the resulting mixture to an aging treatment of several hours duration, and washing the resulting precipitate mixture to remove acid preparatory to the customary subsequent operations of lithopone manufacture.

12. The method of producing high strength lithopone which comprises introducing separately co-precipitated zinc sulphide and barium sulphate into a slurry in which precipitation of zinc sulphide by the reaction between hydrogen sulphide and zinc sulphate is proceeding and thereby subjecting the zinc sulphide in the co-precipitate to the same conditioning environment as the zinc sulphide precipitated by hydrogen sulphide, and washing the resulting precipitate mixture to remove acid preparatory to the customary subsequent operations of lithopone manufacture.

LEON S. HOLSTEIN.